Jan. 8, 1935.  W. H. TSCHAPPAT  1,986,865
TRACK FOR TRACKLAYING VEHICLES
Filed Oct. 24, 1933
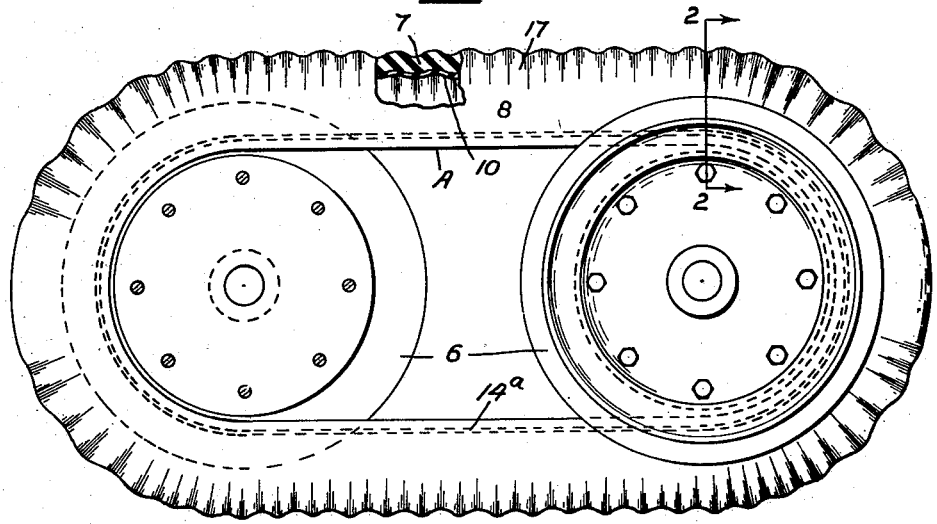
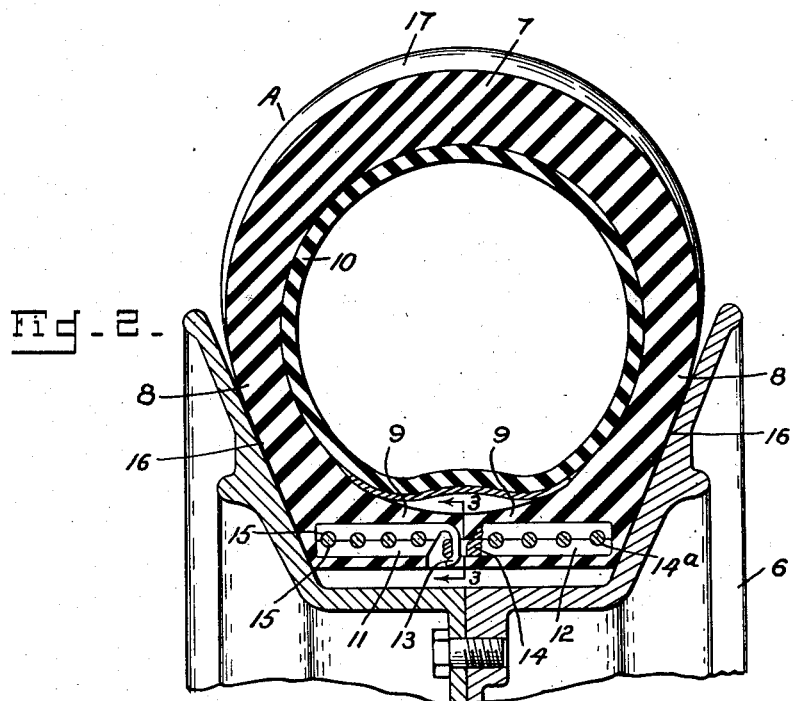
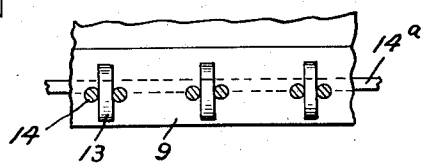
Inventor
William H. Tschappat
By W. N. Roach
Attorney Patented Jan. 8, 1935

1,986,865

UNITED STATES PATENT OFFICE 1,986,865

TRACK FOR TRACKLAYING VEHICLES

William H. Tschappat, United States Army, Washington, D. C.

Application October 24, 1933, Serial No. 694,982

7 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a track for track-laying vehicles. The purpose of this invention is to provide a jointless band track formed in the nature of an automobile tire but arranged to be trained around spaced wheels and to be driven thereby.

The improved track is characterized by a novel tread formation which permits flexing of the track in passing around the wheels, by convergent side walls whereby the track is frictionally driven and by a reinforced and transversely rigid inner wall, divided to permit insertion and removal of an inner tube and readily coupled and uncoupled.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a view in side elevation and partly in section of the improved track.

Fig. 2 is a sectional view on the line 2—2 of Fig. 1 and

Fig. 3 is a sectional view on the line 3—3 of Fig. 2.

Referring to the drawing by characters of references, the track comprises an endless tubular casing A formed of a material such as rubber or rubber and fabric and arranged to be trained around a plurality of wheels 6—6 of a vehicle, at least one of the wheels being power driven and having a V-type rim whereby it may frictionally engage the track.

The casing A includes a tread portion 7, side walls 8—8, and an inner wall 9 divided on its center line to provide an opening for insertion and removal of an inner tube 10 which in the illustration is of the inflatable type.

A series of metal plates 11 and 12 are embedded in the divided portions of the inner wall 9 and are spaced longitudinally of the track so they will not interfere with the flexing of the track about the wheels 6. The plates 11 and 12 are preferably disposed oppositely to one another to afford transverse rigidity to the inner wall and to conveniently position cooperating coupling members which consist of a hook 13 on the plate 11 and an eye 14 on the plate 12.

Reinforcing cables 14ª which may be of metal or textile material extend around the casing and are embedded in the inner wall 9. The cables are in engagement with the plates 11 and 12 and are laterally spaced thereby. For convenience in fabrication and assembly the plates 11 and 12 are each preferably formed in two parts with opposite semi-circular recesses 15—15 receiving the cables.

The inner periphery of the casing constituted by the exterior face of the inner wall 9 is a plane surface and may form a rail for the wheels 6 and for supporting and guide rollers which are customarily disposed between the wheels 6 when the latter are spaced an appreciable distance apart.

The exterior faces 16—16 of the side walls 8—8 of the casing are plane surfaces converging towards the inner wall 9 and adapted to frictionally engage the V-type rim of the wheels 6. While the inflated inner tube tends to maintain a predetermined and uniform distance between the faces 16—16, the rigid plates 11 and 12 also serve in this capacity and in giving lateral stability to the side walls insure driving engagement between the track and drive wheel. The reinforcing cables 14ª by preventing stretching of the track also function in maintaining driving engagement between the track and wheel.

The tread portion 7 is formed with convolutions 17 having a maximum sinuosity over the service area of the tread and then merging with the side walls. The purpose of this structure is to allow flexing of the track in passing around the wheels 6.

The casing A is opened to permit insertion or removal of the inner tube by pressing the divided inner wall containing the plates 11 inwardly towards the center of the casing to uncouple the hooks 13 from the eyes 14. The coupling is effected in the same manner.

I claim.

1. A track for track-laying vehicles comprising an endless tubular casing having a divided inner wall, spaced metal plates embedded in each portion of the divided inner wall, the plates of one portion being opposite the plates of the other portion, a hook on the inner end of each of the plates in one portion, an eye on the corresponding end of each plate in the other portion, the hooks engageable in the eyes, reinforcing members extending around the casing and embedded therein, said members passing through the metal plates and laterally spaced thereby, and an inner tube in the casing.

2. A track for track-laying vehicles comprising an endless tubular casing having a divided inner wall, spaced metal plates embedded in each portion of the divided inner wall, the plates of one portion being opposite the plates of the other portion, a hook on the inner end of each of the plates in one portion, an eye on the corresponding end of each plate in the other portion, the hooks engageable in the eyes, and an inner tube in the casing.

3. A track for track-laying vehicles comprising an endless tubular casing having a divided inner wall, spaced rigid members embedded in each portion of the divided inner wall, the members of one portion being opposite the members of the other portion, coupling means on the adjacent ends of said members, reinforcing members extending around the casing and embedded therein, said members engaging the spaced rigid members and laterally spaced thereby, and an inner tube in the casing.

4. A track for track-laying vehicles comprising an endless tubular casing having a divided inner wall, spaced rigid members embedded in each portion of the divided inner wall, the members of one portion being opposite the members of the other portion, coupling means on the adjacent ends of said members, and an inner tube in the casing.

5. A track for track-laying vehicles comprising an endless tubular casing having a divided inner wall, spaced rigid members embedded in each portion of the divided inner wall, cooperating means integral with said rigid members for detachably connecting the portions of the divided inner wall, and an inner tube in the casing.

6. A track for track-laying vehicles comprising an endless tubular casing having a divided inner wall, spaced rigid members embedded in each portion of the divided inner wall, reinforcing members extending around the casing and embedded therein, said members engaging the spaced rigid members and laterally spaced thereby, and an inner tube in the casing.

7. A track for track-laying vehicles comprising an endless tubular casing having a divided inner wall, reinforcing members extending around the casing and embedded in the inner wall, spaced rigid members embedded in the inner wall and laterally spacing the reinforcing members, and an inner tube in the casing.

WILLIAM H. TSCHAPPAT.